(12) United States Patent
Isami et al.

(10) Patent No.: US 12,654,564 B2
(45) Date of Patent: Jun. 16, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP); Kenji Mizutani, Toyota (JP); Tsuyoshi Okada, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/903,642

(22) Filed: Oct. 1, 2024

(65) Prior Publication Data

US 2025/0153578 A1     May 15, 2025

(30) Foreign Application Priority Data

Nov. 14, 2023    (JP) ................................. 2023-193966

(51) Int. Cl.
B60L 15/20 (2006.01)
B60L 50/60 (2019.01)
G10K 15/04 (2006.01)

(52) U.S. Cl.
CPC .............. B60L 15/20 (2013.01); B60L 50/60 (2019.02); G10K 15/04 (2013.01); B60L 2240/423 (2013.01); B60L 2250/28 (2013.01); B60L 2260/20 (2013.01)

(58) Field of Classification Search
None
See application file for complete search history.

(56) References Cited

U.S. PATENT DOCUMENTS

| | | | | | |
|---|---|---|---|---|---|
| 6,748,301 | B1 * | 6/2004 | Ryu | ........................ | B60R 25/04 |
| | | | | | 340/576 |
| 10,061,315 | B2 * | 8/2018 | Yako | ...................... | B60K 35/28 |
| 10,663,965 | B2 * | 5/2020 | Yako | ...................... | B60K 28/02 |
| 11,267,488 | B2 * | 3/2022 | Namba | ................. | B60W 40/09 |
| 2006/0015234 | A1 | 1/2006 | Luh | | |

(Continued)

FOREIGN PATENT DOCUMENTS

| | | |
|---|---|---|
| JP | 2002-303366 A | 10/2002 |
| JP | 2005-526217 A | 9/2005 |

(Continued)

*Primary Examiner* — Shelley Chen

(74) *Attorney, Agent, or Firm* — Finnegan, Henderson, Farabow, Garrett and Dunner, LLP

(57) ABSTRACT

A battery electric vehicle includes: a driving operation member; a pseudo shifting operation member imitating an operation member that is used to perform a shifting operation of a manual transmission internal combustion engine vehicle; and a controller configured to control the battery electric vehicle according to an operation of the driving operation member. A plurality of control modes includes a manual mode and an automatic mode. The controller includes a memory. The controller determines, upon starting of the battery electric vehicle, whether a new driver who has entered the battery electric vehicle is included in one or more candidate drivers. When the new driver is included in the one or more candidate drivers, the controller starts the control mode linked with the new driver.

11 Claims, 9 Drawing Sheets

(56) References Cited

U.S. PATENT DOCUMENTS

| | | | | |
|---|---|---|---|---|
| 2012/0083958 | A1* | 4/2012 | Ballard | B60W 50/10 |
| | | | | 701/56 |
| 2017/0113701 | A1* | 4/2017 | Lai | B60W 30/188 |
| 2018/0059663 | A1* | 3/2018 | Yako | B60W 60/0059 |
| 2019/0118805 | A1* | 4/2019 | Lim | G09B 9/04 |
| 2020/0372735 | A1* | 11/2020 | Chang | B60R 25/25 |
| 2021/0229550 | A1 | 7/2021 | Isami | |
| 2021/0229633 | A1* | 7/2021 | DeLong | B60R 25/22 |
| 2022/0041155 | A1* | 2/2022 | Isami | B60K 17/02 |
| 2022/0135003 | A1* | 5/2022 | Lee | G06Q 20/40145 |
| | | | | 701/2 |
| 2023/0356603 | A1* | 11/2023 | Hirao | B60W 10/10 |
| 2024/0001950 | A1* | 1/2024 | Ravuri | B60W 50/12 |
| 2024/0083442 | A1* | 3/2024 | Zhao | B60W 60/0051 |
| 2024/0383440 | A1* | 11/2024 | Johnson | G06Q 20/4014 |

FOREIGN PATENT DOCUMENTS

| | | | |
|---|---|---|---|
| JP | 2006-168497 | A | 6/2006 |
| JP | 2018-188082 | A | 11/2018 |
| JP | 6787507 | B1 | 11/2020 |
| JP | 2022-036834 | A | 3/2022 |

* cited by examiner

PERSON B ENTERS BATTERY ELECTRIC VEHICLE 100

→

SELECTS MANUAL MODE AND DRIVES

→

UPDATED AFTER LEAVING BATTERY ELECTRIC VEHICLE 100

103

MEMORY

106

LINKING INFORMATION

| CANDIDATE DRIVER | IDENTIFICATION INFORMATION | LAST SELECTED CONTROL MODE |
|---|---|---|
| PERSON A | APPEARANCE INFORMATION OF PERSON A | AUTOMATIC MODE |
| PERSON B | APPEARANCE INFORMATION OF PERSON B | MANUAL MODE |
| PERSON C | APPEARANCE INFORMATION OF PERSON C | MANUAL MODE |

FIG. 8

MEMORY 103

LINKING INFORMATION 106

| CANDIDATE DRIVER | IDENTIFICATION INFORMATION | LAST SELECTED CONTROL MODE | LAST SELECTED SHIFT MODE | LAST SELECTED ENGINE CHARACTERISTICS | LAST SELECTED DRIVE MODE | LAST SELECTED SUSPENSION CHARACTERISTICS |
|---|---|---|---|---|---|---|
| PERSON A | APPEARANCE INFORMATION OF PERSON A | AUTOMATIC MODE | - | - | - | - |
| PERSON B | APPEARANCE INFORMATION OF PERSON B | MANUAL MODE | PADDLE SHIFT | FULL RANGE TYPE | FOUR-WHEEL DRIVE | MEDIUM |
| PERSON C | APPEARANCE INFORMATION OF PERSON C | MANUAL MODE | STICK SHIFT WITH CLUTCH OPERATIONS | LOW-TO MEDIUM ROTATION TYPE | REAR-WHEEL DRIVE | MEDIUM |

FIG. 9

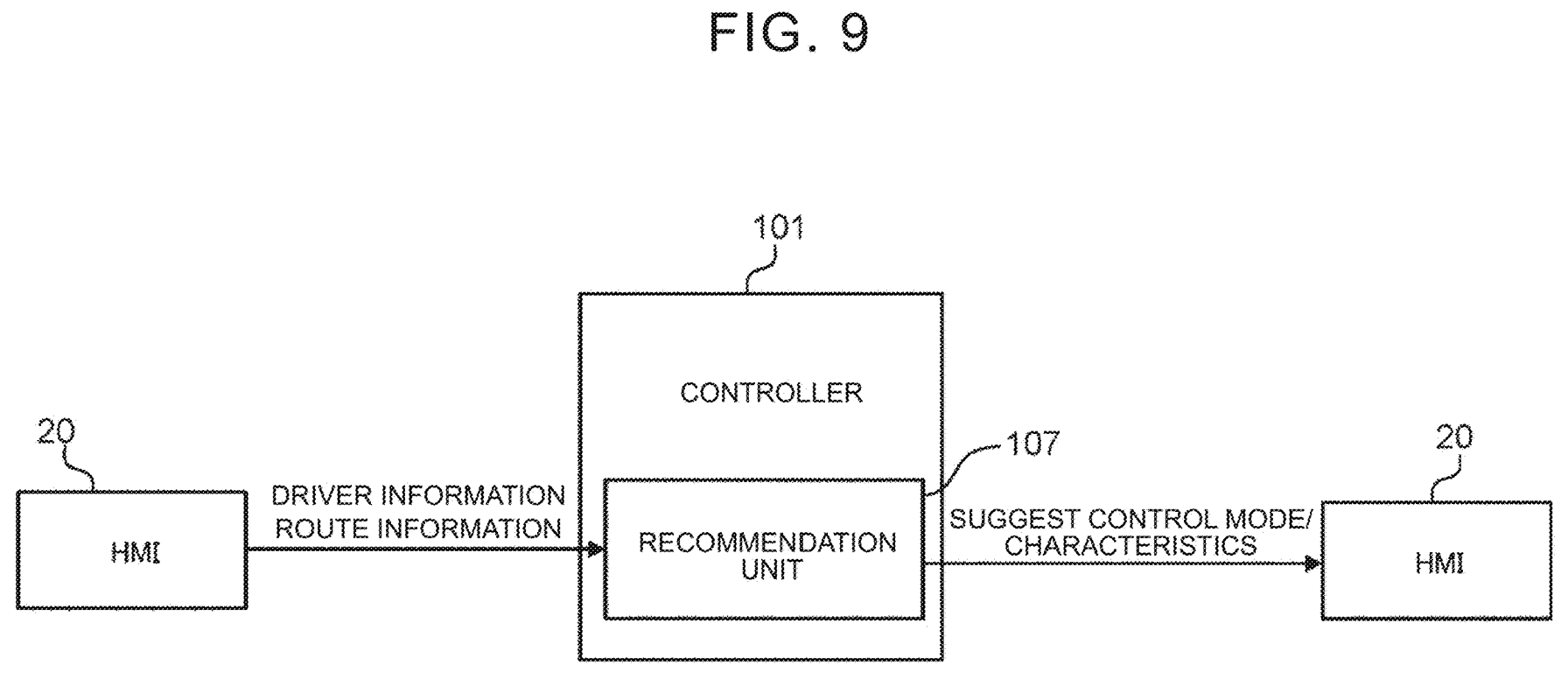

CONTROLLER 101

RECOMMENDATION UNIT 107

HMI 20

HMI 20

DRIVER INFORMATION
ROUTE INFORMATION

SUGGEST CONTROL MODE/
CHARACTERISTICS

BATTERY ELECTRIC VEHICLE

CROSS-REFERENCE TO RELATED APPLICATION

This application claims priority to Japanese Patent Application No. 2023-193966 filed on Nov. 14, 2023, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) discloses a technique related to a battery electric vehicle that can simulate manual shifting operations of a vehicle with a manual transmission powered by an internal combustion engine (hereinafter referred to as "manual transmission internal combustion engine vehicle") by controlling an electric motor.

SUMMARY

The above document discloses a battery electric vehicle having a control mode that simulates a manual transmission internal combustion engine vehicle. The driver can drive this battery electric vehicle as an ordinary battery electric vehicle, and can also enjoy operations that simulate a manual transmission internal combustion engine vehicle while driving the same battery electric vehicle. Alternatively, an engine sound that simulates a manual transmission internal combustion engine vehicle can be output, so that the driver can get a realistic feeling as if he or she were driving a manual transmission speed internal combustion engine vehicle. While such a battery electric vehicle increases the fun for the driver, an increased number of selectable modes also means an increased effort to perform settings. Therefore, the issue is how to improve driver convenience.

A first aspect of the present disclosure is a battery electric vehicle. The battery electric vehicle includes an electric motor as a driving source and has a plurality of control modes that is selectable by a driver. The battery electric vehicle includes: a driving operation member that is used to drive the battery electric vehicle; a pseudo shifting operation member imitating an operation member that is used to perform a shifting operation of a manual transmission internal combustion engine vehicle; and a controller configured to control the battery electric vehicle according to an operation of the driving operation member. The control modes include a manual mode in which an operation of the pseudo shifting operation member is associated with torque of the electric motor, and an automatic mode in which the operation of the pseudo shifting operation member is not associated with the torque of the electric motor. The controller includes a memory configured to store linking information in which one or more candidate drivers are linked with the control mode and registered. The controller is configured to determine, upon starting of the battery electric vehicle, whether a new driver who has entered the battery electric vehicle is included in the one or more candidate drivers. The controller is configured to, when the new driver is included in the one or more candidate drivers, start the control mode linked with the new driver.

In the battery electric vehicle, the control mode linked with the new driver may be the control mode that was selected when the new driver last drove the battery electric vehicle.

In the battery electric vehicle, the control mode that was selected when the new driver last drove the battery electric vehicle may be the control mode that had been set between when the new driver last finished driving the battery electric vehicle and when the new driver turned off power of the battery electric vehicle, or the control mode that was set when the new driver last entered the battery electric vehicle and turned on accessory power of the battery electric vehicle.

In the battery electric vehicle, when in the manual mode, a characteristic of the manual transmission internal combustion engine vehicle that is to be simulated by the battery electric vehicle may be determined according to a setting related to a detailed mode that is selectable by the driver. The linking information may include information about the setting related to the detailed mode linked with the one or more candidate drivers. The controller (101) may be configured to, when the new driver has been linked with the manual mode upon starting of the battery electric vehicle (100), set the detailed mode to the setting linked with the new driver.

In the battery electric vehicle, the setting related to the detailed mode may be either a selection result from options or a combination of selection results from the options, the options being options related to any one or more of the following: an engine characteristic, an engine sound, a drive mode, and a suspension characteristic.

In the battery electric vehicle, the setting related to the detailed mode may be either a selection result from options or a combination of selection results from the options, the options being options related to any one or more of the following: a shift mode, an engine characteristic, an engine sound, a drive mode, and a suspension characteristic.

In the battery electric vehicle, the driving operation member may include an accelerator pedal. The pseudo shifting operation member may include a pseudo H-shifter imitating an H-shifter of a manual transmission, and a pseudo clutch operation device imitating a clutch operation device.

In the battery electric vehicle, the controller may be configured to, when in the control mode, change the torque of the electric motor according to a shift position selected by the pseudo H-shifter, an amount of operation of the pseudo clutch operation device, and an amount of operation of the accelerator pedal.

In the battery electric vehicle, the driving operation member may include an accelerator pedal. The pseudo shifting operation member may include a pseudo sequential shifter imitating a sequential shifter of a manual transmission.

In the battery electric vehicle, the controller may be configured to, when in the control mode, change the torque of the electric motor according to a shift position selected by the pseudo sequential shifter and an amount of operation of the accelerator pedal.

In the battery electric vehicle, the driving operation member may include an accelerator pedal. The pseudo shifting operation member may include a pseudo H-shifter imitating an H-shifter of a manual transmission.

In the battery electric vehicle, the controller may be configured to, when in the control mode, change the torque of the electric motor according to a shift position selected by the pseudo H-shifter and an amount of operation of the accelerator pedal.

In the battery electric vehicle, the driving operation member may include an accelerator pedal. The pseudo shifting operation member may include a pseudo H-shifter imitating an H-shifter of a manual transmission, a pseudo clutch operation device imitating a clutch operation device, and a pseudo sequential shifter imitating a sequential shifter of the manual transmission. The detailed mode may include: a mode in which the torque of the electric motor is changed according to a shift position selected by the pseudo H-shifter, an amount of operation of the pseudo clutch operation device, and an amount of operation of the accelerator pedal; a mode in which the torque of the electric motor is changed according to a shift position selected by the pseudo sequential shifter and the amount of operation of the accelerator pedal; and a mode in which the torque of the electric motor is changed according to the shift position selected by the pseudo H-shifter and the amount of operation of the accelerator pedal.

A second aspect of the present disclosure is a battery electric vehicle. The battery electric vehicle includes an electric motor as a driving source. The battery electric vehicle includes: a speaker configured to output a sound to inside of the battery electric vehicle; and a controller configured to generate a pseudo engine sound and output the pseudo engine sound from the speaker. The pseudo engine sound is generated based on one of a plurality of sound sources as selected by a driver. The controller includes a memory configured to store linking information in which one or more candidate drivers are linked with the sound source and registered. The controller is configured to determine, upon starting of the battery electric vehicle, whether a new driver who has entered the battery electric vehicle is included in the one or more candidate drivers. The controller is configured to, when the new driver is included in the one or more candidate drivers, set the sound source linked with the new driver as the sound source that generates the pseudo engine sound.

According to the battery electric vehicle of the present disclosure, each candidate driver is linked with the control mode or the sound source and registered in the memory. The controller refers to the memory. When a new driver who has entered the battery electric vehicle is included in the candidate drivers, the controller sets the control mode or sound source linked with the new driver. Since the controller automatically performs settings, the driver does not have to perform the settings every time he or she enters the battery electric vehicle. This relieves the driver of the hassle. Driver convenience can thus be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a tree diagram showing an example of the control modes of the battery electric vehicle that can be selected by the controller;

FIG. 4 shows the configuration of a controller related to driving control of the battery electric vehicle;

FIG. 6 is a block diagram showing an example of linking information;

FIG. 8 is a block diagram showing another example of the linking information; and FIG. 9 is a block diagram showing an example of the configuration of the controller related to suggestion of recommended settings.

DETAILED DESCRIPTION OF EMBODIMENTS

1. Configuration of Power System of Battery Electric Vehicle

Figure 1:
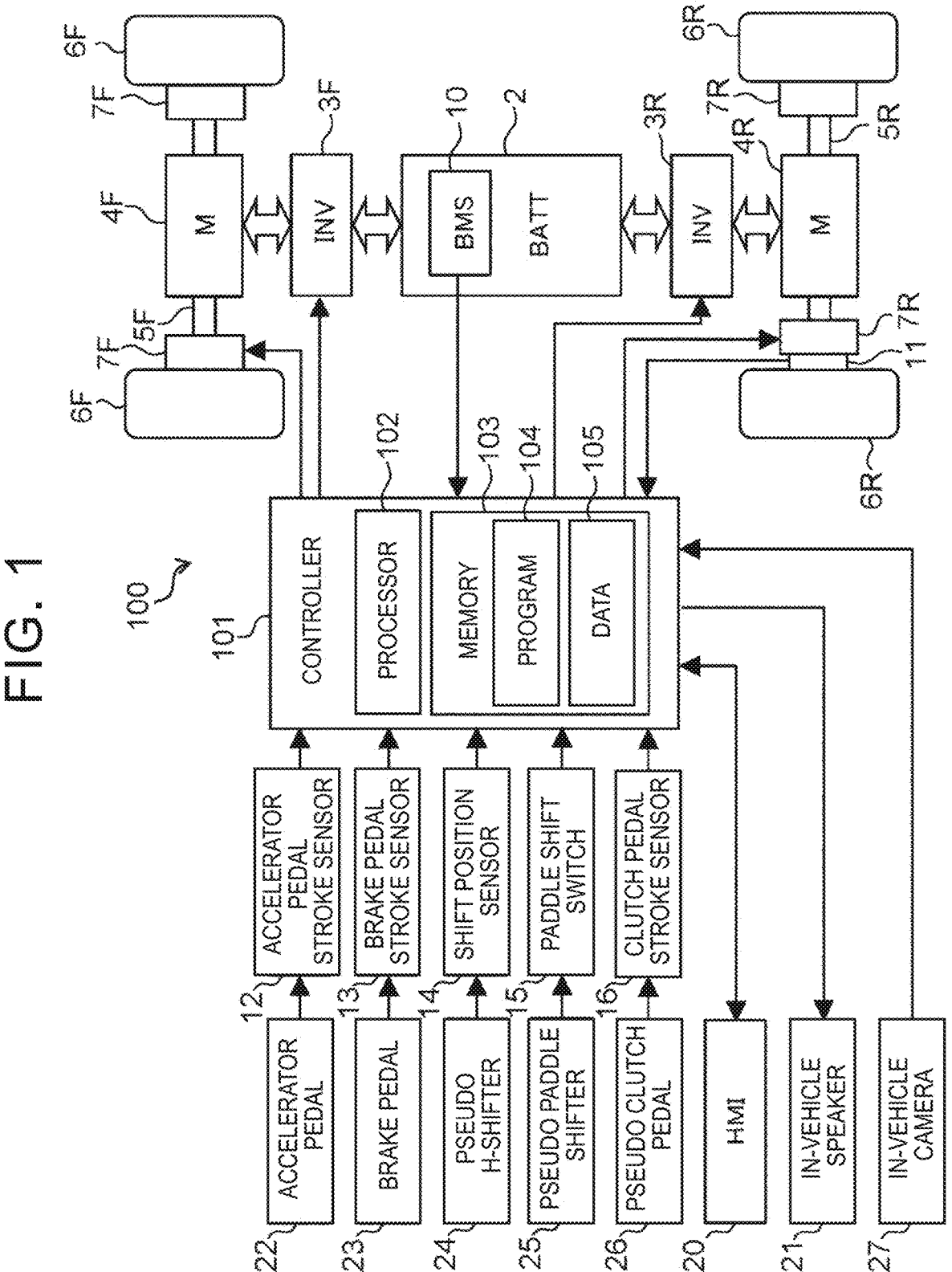
FIG. 1 shows the configuration of a battery electric vehicle according to an embodiment of the present disclosure.

FIG. 1 schematically shows the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at the front and rear as traction power sources. The electric motors 4F, 4R are, for example, three-phase alternating current (AC) motors. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The front electric motor 4F and the rear electric motor 4R are equipped with inverters (INVs) 3F, 3R, respectively. The front inverter 3F and the rear inverter 3R are each connected to a battery (BATT) 2. The battery 2 stores electrical energy for driving the electric motors 4F, 4R. That is, the battery electric vehicle 100 is a battery electric vehicle (BEV) that runs on the electrical energy stored in the battery 2. The inverters 3F, 3R are, for example, voltage inverters, and control the torque of the electric motors 4F, 4R by pulse width modulation (PWM) control, respectively.

2. Configuration of Control System of Battery Electric Vehicle

Next, the configuration of a control system of the battery electric vehicle 100 will be described with reference to FIG. 1.

The battery electric vehicle 100 includes a battery management system (BMS) 10. The battery management system 10 is a device that monitors the cell voltage, current, temperature, etc. of the battery 2. The battery management system 10 has a function to estimate the state of charge (SOC) of the battery 2.

The battery electric vehicle 100 includes a vehicle speed sensor 11. At least one of wheel speed sensors, not shown, mounted on the right and left front wheels 6F and the right and left rear wheels 6R is used as the vehicle speed sensor 11. The battery electric vehicle 100 also includes an accelerator pedal stroke sensor 12. The accelerator pedal stroke sensor 12 is provided for an accelerator pedal 22, and outputs a signal indicating the amount of depression of the accelerator pedal 22, i.e., the accelerator operation amount. The battery electric vehicle 100 further includes a brake pedal stroke sensor 13. The brake pedal stroke sensor 13 is provided for a brake pedal 23, and outputs a signal that indicates the amount of depression of the brake pedal 23, that is, the brake operation amount.

The accelerator pedal 22 and the brake pedal 23 are driving operation members that are used to drive the battery electric vehicle 100. In addition to these driving operation members, the battery electric vehicle 100 includes pseudo shifting operation members that imitate operation members used to perform shifting operations of a manual transmission internal combustion engine vehicle. The pseudo shifting operation members include a pseudo H-shifter 24, a pseudo paddle shifter 25, and a pseudo clutch pedal 26, which will be described below.

The pseudo H-shifter 24 is a dummy different from a real H-shifter. The pseudo H-shifter 24 has a structure imitating a shift stick provided on a console, and is movable between shift positions along an H-pattern gate. Since the battery electric vehicle 100 does not have an actual transmission, the shift positions of the pseudo H-shifter 24 are virtual shift positions. The pseudo H-shifter 24 is provided with a shift position sensor 14. The shift position sensor 14 outputs a signal indicating the shift position selected by the pseudo H-shifter 24.

The pseudo paddle shifter 25 is a dummy different from a real paddle shifter that is a type of sequential shifter. The pseudo paddle shifter 25 has a structure imitating shift paddles attached to a steering wheel, and includes right and left paddles that can be moved independently. The pseudo paddle shifter 25 is provided with a paddle shift switch 15. The paddle shift switch 15 outputs an upshift signal when the right paddle is pulled, and outputs a downshift signal when the left paddle is pulled.

The pseudo clutch pedal 26 is a dummy different from a real clutch pedal. The pseudo clutch pedal 26 has a structure imitating a clutch pedal of a conventional manual transmission internal combustion engine vehicle. For example, the pseudo clutch pedal 26 includes a reaction force mechanism that generates a reaction force in response to depression of the pseudo clutch pedal 26 by the driver. A start position of the pseudo clutch pedal 26 is a position when no depressing force is applied to the pseudo clutch pedal 26, and an end position of the pseudo clutch pedal 26 is a position when the pseudo clutch pedal 26 is depressed all the way down. The driver can operate the pseudo clutch pedal 26 from the start position to the end position against the reaction force from the reaction force mechanism. The pseudo clutch pedal 26 is provided with a clutch pedal stroke sensor 16. The clutch pedal stroke sensor 16 outputs a signal indicating the amount of depression of the pseudo clutch pedal 26. Since the battery electric vehicle 100 does not include an actual clutch, the amount of operation of the pseudo clutch pedal 26, that is, the clutch operation amount, is a virtual clutch operation amount.

Although the pseudo clutch pedal 26 is a pedal-type operation device that is operated by foot, a lever-type or dial-type operation device that is operated by hand may be provided as a pseudo clutch operation device. The pseudo clutch operation device may have various structures as long as the driver can operate the pseudo clutch operation device from its start position to its end position against the reaction force and can experience an operation feel like a clutch pedal of a conventional manual transmission internal combustion engine vehicle with his or her foot or hand.

The battery electric vehicle 100 further includes a human-machine interface (HMI) 20 as an interface with the driver, an in-vehicle speaker 21, and an in-vehicle camera 27. The HMI 20 includes a touch panel display. The HMI 20 displays information on the touch panel display, and receives inputs from the driver through touch operations on the touch panel display. The in-vehicle speaker 21 can provide information to the driver by voice, and can also output a pseudo engine sound described later. The in-vehicle camera 27 can capture an image of the inside of the battery electric vehicle 100 such as the driver's seat and acquire the image.

The battery electric vehicle 100 includes a controller 101. Sensors and devices to be controlled that are mounted on the battery electric vehicle 100 are connected to the controller 101 via an in-vehicle network. In addition to the battery management system 10, the vehicle speed sensor 11, the accelerator pedal stroke sensor 12, the brake pedal stroke sensor 13, the shift position sensor 14, the paddle shift switch 15, the clutch pedal stroke sensor 16, and the in-vehicle camera 27, various other sensors are mounted on the battery electric vehicle 100.

The controller 101 is typically an electronic control unit (ECU). The controller 101 may be a combination of a plurality of ECUs. The controller 101 includes at least a processor 102 and a memory 103. The memory 103 includes a random access memory (RAM) for temporarily recording data and a read-only memory (ROM) for storing a program 104 that is executable by the processor 102 and various types of data 105 related to the program. The data 105 stored in the memory 103 includes at least linking information described later. The data 105 may further include map data for calculating a travel route of the battery electric vehicle 100. The program 104 is composed of a plurality of instructions. The processor 102 reads the program 104 and the data 105 from the memory 103, executes the program 104, and generates control signals based on signals acquired from the sensors. The controller 101 may include one processor 102, or may include a plurality of processors 102.

The controller 101 can control the battery electric vehicle 100 in various control modes. The driver can select a control mode by performing a touch operation on the touch panel display of the HMI 20. Specifically, when a touch operation is performed on the touch panel display of the HMI 20, one or more programs 104 linked with the touch operation are read from the memory 103 and executed by the processor 102. The control modes of the battery electric vehicle 100 by the controller 101 that can be selected by the driver by operating the HMI 20 will be described below.

3. Control Modes of Battery Electric Vehicle

Figure 2:
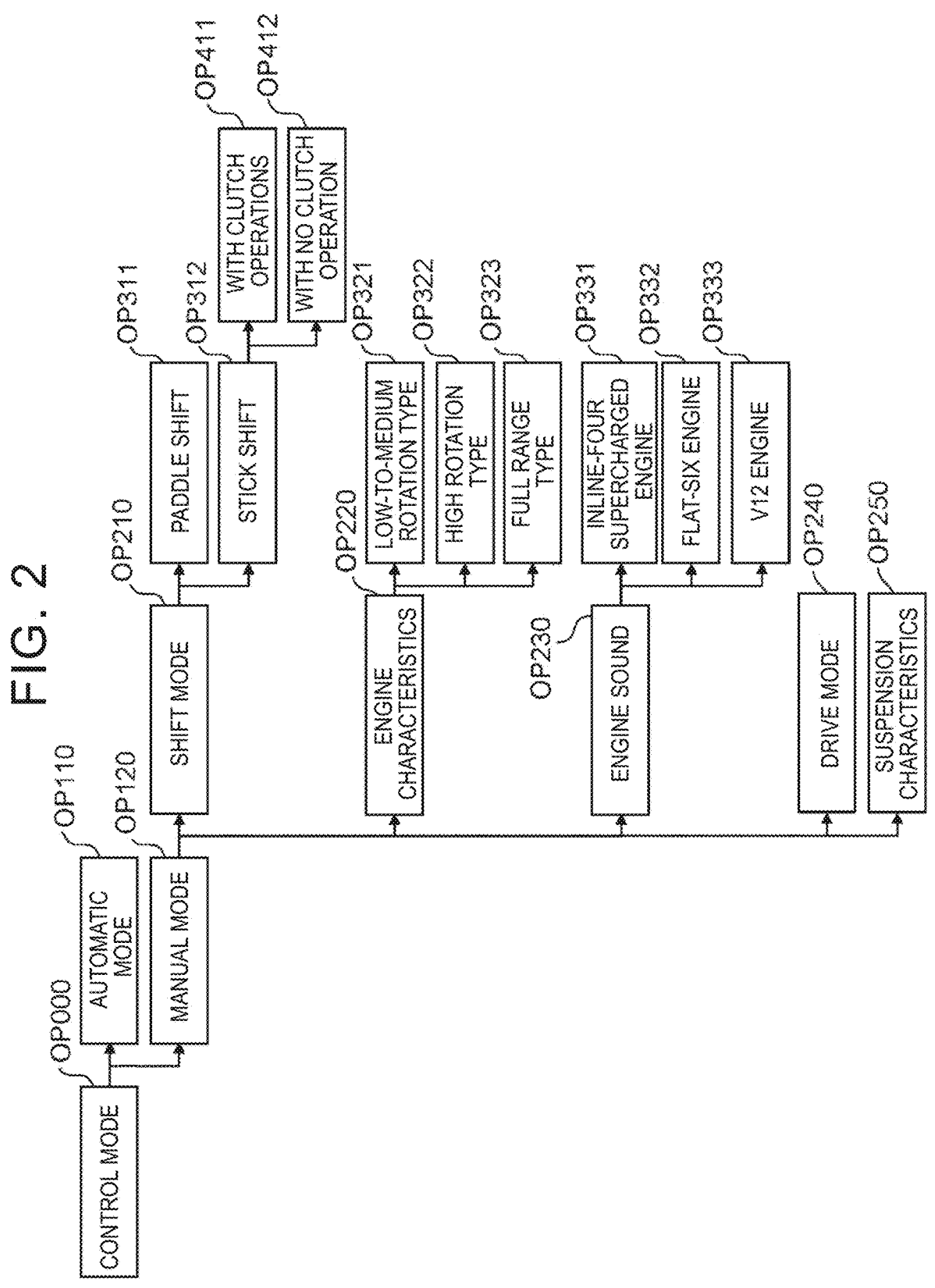
FIG. 2 is a tree diagram showing an example of control modes of the battery electric vehicle that can be selected by a controller.
Figure 3:
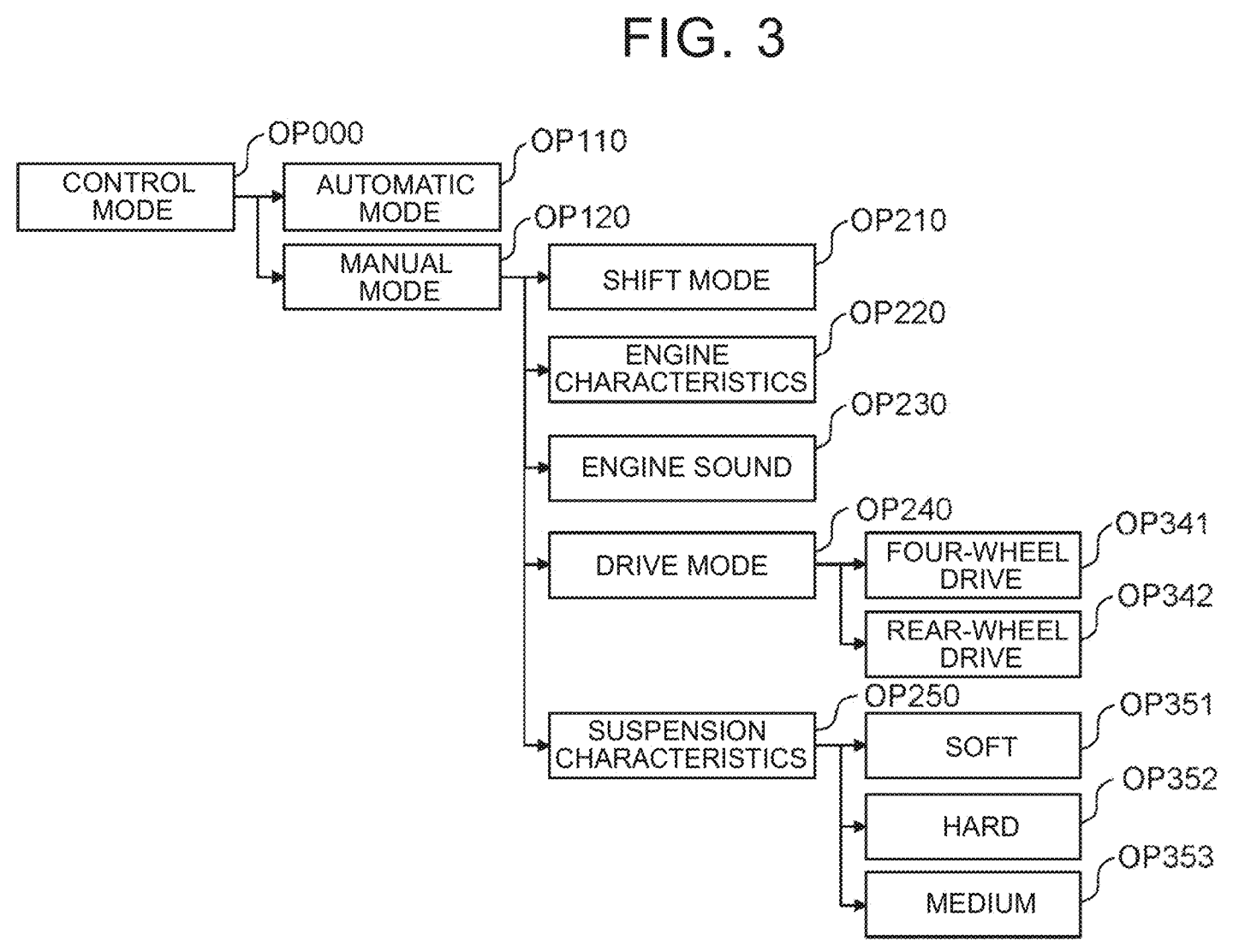

FIGS. 2 and 3 are tree diagrams showing an example of the control modes of the battery electric vehicle 100 that can be selected by the controller 101. A selection screen is displayed on the touch panel display of the HMI 20 according to the control tree shown in FIG. 2.

An option "control mode" OP000 is displayed on the initial screen of the HMI 20. When the option "control mode" OP000 is selected, options "automatic mode" OP110 and "manual mode" OP120 are displayed on the touch panel display. When the option "automatic mode" OP110 is selected, the control mode of the battery electric vehicle 100 is switched to an automatic mode. The automatic mode is a control mode for driving the battery electric vehicle 100 as a normal BEV. In the automatic mode, the driver can basically drive the battery electric vehicle 100 only by operating the accelerator pedal 22, the brake pedal 23, and the steering wheel, not shown. In the automatic mode, shift operations of the pseudo H-shifter 24, shift operations of the pseudo paddle shifter 25, and clutch operations of the pseudo clutch pedal 26 are disabled.

When the option "manual mode" OP120 is selected, the control mode of the battery electric vehicle 100 is switched to a manual mode. The manual mode is a control mode in which the battery electric vehicle 100 is operated like a manual transmission internal combustion engine vehicle. When the option "manual mode" OP120 is selected, options "shift mode" OP210, "engine characteristics" OP220, "engine sound" OP230, "drive mode" OP240, and "suspension characteristics" OP250 are displayed on the touch panel display. By combining the options OP210 to OP250 as desired, the driver can determine the characteristics of a manual transmission internal combustion engine vehicle that he or she wants the battery electric vehicle 100 to simulate.

The option "shift mode" OP210 is an option to select a shift mode of a manual transmission when the battery electric vehicle 100 is operated like a manual transmission internal combustion engine vehicle. As shown in FIG. 2, when the option "shift mode" OP210 is selected, options "paddle shift" OP311 and "stick shift" OP312 are displayed on the touch panel display. When the option "paddle shift" OP311 is selected, the shift mode of the manual transmission replicated by the battery electric vehicle 100 is switched to a paddle shift mode. The paddle shift mode is a mode in which the pseudo paddle shifter 25 is used for shift operations. In the paddle shift mode, shift operations of the pseudo H-shifter 24 are disabled. In the paddle shift mode, the operation when the gear ratio of the manual transmission is changed is replicated by a shift operation of the pseudo paddle shifter 25. Clutch operations in a real paddle-shift manual transmission are automatically performed by a robot. Therefore, no clutch operations of the pseudo clutch pedal 26 are required in the paddle shift mode. In the paddle shift mode, clutch operations of the pseudo clutch pedal 26 are disabled.

When the option "stick shift" OP312 is selected, a stick shift mode is selected. The stick shift mode is a mode in which the pseudo H-shifter 24 is used for shifting operations. In the stick shift mode, shift operations of the pseudo paddle shifter 25 are disabled. In the stick shift mode, the operation when the gear ratio of the manual transmission is changed is replicated by a shift operation of the pseudo H-shifter 24. Some real H-shifter manual transmissions allow the driver to perform clutch operations while others leave clutch operations to a robot. When the option "stick shift" OP312 is selected, options "with clutch operations" OP411 and "with no clutch operation" OP412 are displayed on the touch panel display. When the option "with clutch operations" OP411 is selected, the stick shift mode is switched to a mode that requires clutch operations of the pseudo clutch pedal 26. On the other hand, when the option "with no clutch operation" OP412 is selected, clutch operations of the pseudo clutch pedal 26 are disabled, and the stick shift mode is switched to a mode that does not require clutch operations of the pseudo clutch pedal 26.

The option "engine characteristics" OP220 is an option to select characteristics of an internal combustion engine when the battery electric vehicle 100 is operated like a manual transmission internal combustion engine vehicle. As shown in FIG. 2, when the option "engine characteristics" OP220 is selected, options "low to medium rotation type" OP321, "high rotation type" OP322, and "full range type" OP323 are displayed on the touch panel display. When the option "low to medium rotation type" OP321 is selected, the characteristics of the internal combustion engine replicated by the battery electric vehicle 100 are switched to a low to medium rotation type in which the torque in a low to medium rotation range is relatively high. When the option "high rotation type" OP322 is selected, the characteristics of the internal combustion engine replicated by the battery electric vehicle 100 are switched to a high rotation type in which the torque in a high rotation range is relatively high. When the option "full range type" OP323 is selected, the characteristics of the internal combustion engine replicated by the battery electric vehicle 100 are switched to a full range type in which the torque is uniform in the entire rotation range. Note that the low to medium rotation type, the high rotation type, and the full range type are merely examples of the engine characteristics that can be replicated by control of the battery electric vehicle 100.

The option "engine sound" OP230 is an option to select an engine sound to be replicated by the battery electric vehicle 100. As shown in FIG. 2, when the option "engine sound" OP230 is selected, options "inline-four supercharged engine" OP331, "flat-six engine" OP332, and "V12 engine" OP333 are displayed on the touch panel display. When the option "inline-four supercharged engine" OP331 is selected, the engine sound replicated by the battery electric vehicle 100 is switched to an engine sound of an inline-four supercharged engine. When the option "flat-six engine" OP332 is selected, the engine sound replicated by the battery electric vehicle 100 is switched to an engine sound of a flat-six engine. When the option "V12 engine" OP333 is selected, the engine sound replicated by the battery electric vehicle 100 is switched to an engine sound of a V12 engine. Note that the inline-four supercharged engine, the flat-six engine, and the V12 engine are merely examples of the engine sound that can be replicated by the battery electric vehicle 100.

The option "drive mode" OP240 is an option to select a drive mode of the battery electric vehicle 100. As shown in FIG. 3, when the option "drive mode" OP240 is selected, options "four-wheel drive" OP341 and "rear-wheel drive" OP342 are displayed on the touch panel display. When the option "four-wheel drive" OP341 is selected, the drive mode of the battery electric vehicle 100 is switched to a four-wheel drive mode. In the four-wheel drive mode, the front wheels 6F are driven by the front electric motor 4F, and the rear wheels 6R are driven by the rear electric motor 4R. Torque distribution between the front wheels 6F and the rear wheels 6R can be fixed or made variable by controlling the electric motors 4F, 4F by the inverters 3F, 3R. When the option "rear-wheel drive" OP342 is selected, the drive mode of the battery electric vehicle 100 is switched to a rear-wheel drive mode. In the rear-wheel drive mode, only the rear wheels 6R are driven by the rear electric motor 4R. The drive mode of the battery electric vehicle 100 may include an option of a front-wheel drive mode in which only the front wheels 6F are driven by the front electric motor 4F, instead of or in addition to the rear-wheel drive mode.

The option "suspension characteristics" OP250 is an option to select suspension characteristics of the battery electric vehicle 100. As shown in FIG. 3, when the option "suspension characteristics" OP250 is selected, options "soft" OP351, "hard" OP352, and "medium" OP353 are displayed on the touch panel display. When the option "soft" OP351 is selected, the suspension characteristics of the battery electric vehicle 100 are switched to a soft mode. In the soft mode, damping forces of the suspensions 7F, 7R are reduced. When the option "hard" OP352 is selected, the suspension characteristics of the battery electric vehicle 100 are switched to a hard mode. In the hard mode, the damping forces of the suspensions 7F, 7R are increased. When the option "medium" OP353 is selected, the suspension characteristics of the battery electric vehicle 100 are switched to a medium mode. In the medium mode, the damping forces of the suspensions 7F, 7R are set to an intermediate value between the value in the soft mode and the value in the hard mode. Since the suspensions 7F, 7R are electronically controlled suspensions, the suspension characteristics of the suspensions 7F, 7R can be adjusted in a wide range. Therefore, the soft mode, the hard mode, and the medium mode are merely examples of the suspension characteristics that can be implemented in the battery electric vehicle 100. The drive mode and the suspension characteristics may be made selectable not only in the manual mode but also in the automatic mode.

The driver can switch the control mode of the battery electric vehicle 100 to his or her preference by operating the touch panel display of the HMI 20 according to the control tree described above. The switchable control modes include modes related to driving control of the battery electric vehicle 100 and modes related to sound control of the battery electric vehicle 100. Specifically, the modes related to the option "engine sound" OP230 are the modes related to sound control, and the remaining modes are the modes related to driving control. In the following sections, the driving control and sound control of the battery electric vehicle 100 by the controller 101 will be described.

4. Driving Control of Battery Electric Vehicle

Figure 4:
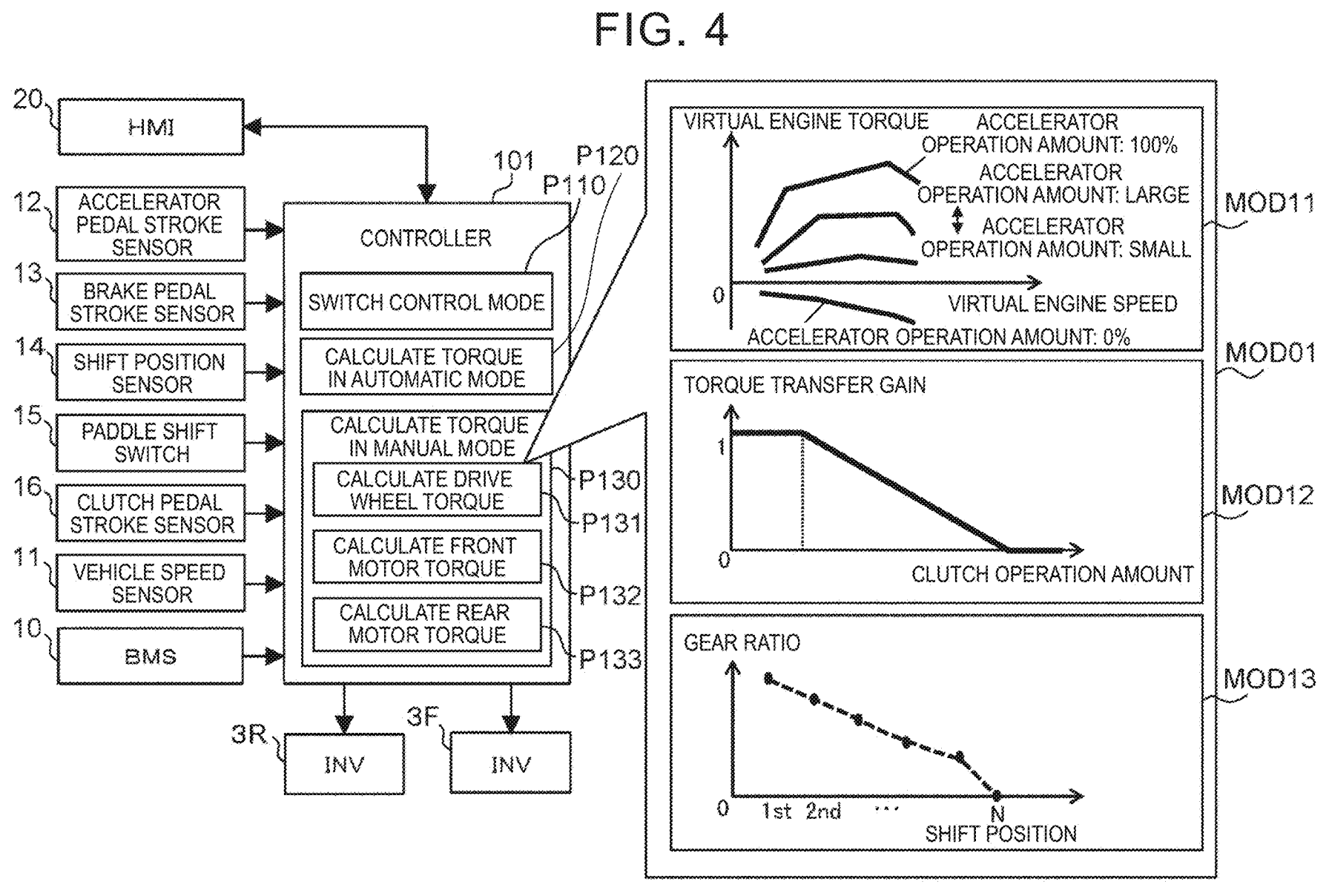

FIG. 4 shows the configuration of the controller 101 related to the driving control of the battery electric vehicle 100. Specifically, FIG. 4 shows a configuration related particularly to torque control out of the driving control. The processor 102 functions as a driving control device when the processor 102 executes one or more driving control programs 104 stored in the memory 103.

A control mode signal is input from the HMI 20 to the controller 101 that functions as a driving control device. The control mode signal includes information about the control mode selected by the driver. The controller 101 performs a process P110 based on the control mode signal. In the process P110, the control mode is switched according to the control mode signal. Switching of the control mode that particularly affects the driving control is switching between the automatic mode and the manual mode.

When the control mode is switched to the automatic mode, the controller 101 performs a process P120 of calculating torque in the automatic mode. In the process P120, the controller 101 acquires a vehicle speed from a signal from the vehicle speed sensor 11, and acquires an accelerator operation amount from a signal from the accelerator pedal stroke sensor 12. The controller 101 has a motor torque map that uses an accelerator operation amount and a vehicle speed as parameters. The controller 101 inputs the acquired vehicle speed and accelerator operation amount to the motor torque map, and controls the inverters 3F, 3R so as to cause the electric motors 4F, 4R to generate the torque obtained from the motor torque map.

When the control mode is switched to the manual mode, the controller 101 performs a process P130 of calculating torque in the manual mode. The process P130 includes a process P131 of calculating torque to be generated by drive wheels. The process P130 also includes a process P132 and a process P133. The process P132 is a process of calculating torque to be generated by the front electric motor 4F, and the process P133 is a process of calculating torque to be generated by the rear electric motor 4R. The processes P132, P133 are performed according to the drive wheel torque calculated in the process P130 and the torque distribution between the front wheels 6F and the rear wheels 6R.

A vehicle model MOD01 is used to calculate the drive wheel torque in the process P131. The vehicle model MOD01 includes an engine model MOD11, a clutch model MOD12, and a transmission model MOD13. An engine virtually implemented by the vehicle model MOD01 will be referred to as "virtual engine," a clutch virtually implemented by the vehicle model MOD01 will be referred to as "virtual clutch," and a transmission virtually implemented by the vehicle model MOD01 will be referred to as "virtual transmission." The engine model MOD11 models the virtual engine. The clutch model MOD12 models the virtual clutch. The transmission model MOD13 models the virtual transmission.

The engine model MOD11 calculates a virtual engine speed and virtual engine torque. The virtual engine speed is calculated from the vehicle speed, the overall reduction ratio, and the slip ratio of the virtual clutch. The virtual engine torque is calculated from the virtual engine speed and the accelerator operation amount. The vehicle speed is acquired from a signal from the vehicle speed sensor 11. The accelerator operation amount is acquired from a signal from the accelerator pedal stroke sensor 12. The overall reduction ratio is a numerical value obtained by multiplying the gear ratio of the virtual transmission by the reduction ratio determined by the mechanical structure from the virtual transmission to the drive wheels. The engine model MOD11 defines the relationship between the virtual engine speed and the virtual engine torque for each accelerator operation amount. The driver can select engine characteristics of the engine model MOD11 by operating the HMI 20. In the example shown in FIG. 2, the engine characteristics can be selected from the low to medium rotation type, the high rotation type, and the full range type.

The clutch model MOD12 calculates a torque transfer gain. The torque transfer gain is a gain for calculating the degree of torque transfer of the virtual clutch according to the clutch operation amount. When the stick shift mode with clutch operations is selected as the shift mode, the clutch operation amount is acquired from a signal from the clutch pedal stroke sensor 16. The clutch operation amount is 0% at the start position of the pseudo clutch pedal 26 and is 100% at the end position of the pseudo clutch pedal 26. The clutch model MOD12 gives the torque transfer gain with respect to the clutch operation amount. The torque transfer gain is converted to the clutch torque capacity of the virtual clutch, i.e., the virtual clutch torque capacity. Virtual clutch torque that is input from the virtual clutch to the virtual transmission is calculated based on a comparison between the virtual clutch torque capacity and the virtual engine torque calculated by the engine model MOD11. The clutch model MOD12 calculates the slip ratio by subtracting the torque transfer gain from 1. The slip ratio is used to calculate the virtual engine speed in the engine model MOD11.

When the paddle shift mode is selected as the shift mode, the clutch operation amount to be input to the clutch model MOD12 is calculated using a clutch operation model. When the stick shift mode with no clutch operation is selected as the shift mode, the clutch operation amount to be input to the clutch model MOD12 is calculated using the clutch operation model. The clutch operation model is a model that simulates clutch operations by a model driver. When the paddle shift mode is selected, the vehicle speed, the virtual engine speed, and a signal from the paddle shift switch 15 are input to the clutch operation model. When the stick shift mode with no clutch operation is selected, the vehicle speed, the virtual engine speed, and a signal from the shift position sensor 14 are input to the clutch operation model.

The signal from the paddle shift switch 15 and the signal from the shift position sensor 14 are used to determine the timing of a clutch operation. When a shift operation by the driver is detected based on the signal from the paddle shift switch 15 or the signal from the shift position sensor 14, the clutch operation model maximizes the clutch opening amount to disengage the virtual clutch. The vehicle speed and the virtual engine speed are used to calculate the clutch operation amount. The clutch operation model calculates the clutch operation amount based on the difference between the rotational speed of an input shaft of the virtual transmission calculated from the vehicle speed and the virtual engine speed, so as to smoothly match the rotational speed of the input shaft of the virtual transmission with the virtual engine speed.

The transmission model MOD13 calculates a virtual gear ratio. The virtual gear ratio is a gear ratio determined by the virtual shift position of the virtual transmission. The virtual gear ratio is set for each shift position. The highest virtual gear ratio is set for first gear, followed by second gear, third gear, fourth gear, . . . in descending order. In the stick shift mode, the shift positions are in one-to-one correspondence with the signals from the shift position sensor 14. In the paddle shift mode, the shift position is shifted up by one gear in response to an upshift signal from the paddle shift switch 15, and the shift position is shifted down by one gear in response to a downshift signal from the paddle shift switch 15. While the number of shift positions of the pseudo H-shifter 24 is physically determined, there is no physical limit on the number of shift positions of the pseudo paddle shifter 25. Therefore, the transmission model MOD13 may be made different between the stick shift mode and the paddle shift mode so that the number of shift positions in the paddle shift mode is larger than the number of shift positions in the stick shift mode.

The transmission model MOD13 calculates virtual transmission torque using the virtual gear ratio and the virtual clutch torque. The virtual transmission torque is virtual torque output from the virtual transmission. The controller 101 controls the inverters 3F, 3R so as to change the output torque of the electric motors 4F, 4R according to the virtual transmission torque. The virtual transmission torque changes discontinuously in response to a change in virtual gear ratio. Such a discontinuous change in virtual transmission torque causes torque shock in the battery electric vehicle 100, creating a feel of a vehicle with a stepped transmission.

The vehicle model MOD01 calculates the drive wheel torque from the virtual transmission torque and the reduction ratio. When the four-wheel drive mode is selected as the drive mode, the drive wheel torque is the sum of torques applied to the right and left front wheels 6F and the right and left rear wheels 6R. The torque distribution between the front wheels 6F and the rear wheels 6R may be fixed, or may be actively or passively varied. When the rear-wheel drive mode is selected as the drive mode, the drive wheel torque is the sum of torques applied to the right and left rear wheels 6R.

In the process P132, the torque of the front electric motor 4F (front motor torque) in the manual mode is calculated by multiplying the drive wheel torque calculated in the process P131 by the torque distribution rate to the front wheels 6F and the reduction ratio from the output shaft of the front electric motor 4F to the front wheels 6F. The controller 101 controls the front inverter 3F so as to cause the front electric motor 4F to generate the front motor torque calculated in the process P132.

In the process P133, the torque of the rear electric motor 4R (rear motor torque) in the manual mode is calculated by multiplying the drive wheel torque calculated in the process P131 by the torque distribution rate to the rear wheels 6R and the reduction ratio from the output shaft of the rear electric motor 4R to the rear wheels 6R. The controller 101 controls the rear inverter 3R so as to cause the rear electric motor 4R to generate the rear motor torque calculated in the process P133.

In the configuration shown in FIG. 4, the battery management system 10 and the brake pedal stroke sensor 13 are not necessarily required for the driving control described above. However, when switching of the control mode affects the SOC of the battery 2, a signal from the battery management system 10 may be used as information for determining whether to allow switching of the control mode. In the case where the method of operating the battery electric vehicle 100 changes significantly such as when the control mode is switched between the automatic mode and the manual mode, the control mode may be switched on condition that the brake pedal 23 is being depressed. In that case, a signal from the brake pedal stroke sensor 13 can be used as information for determining whether the brake pedal 23 is being depressed.

5. Sound Control of Battery Electric Vehicle

Figure 5:
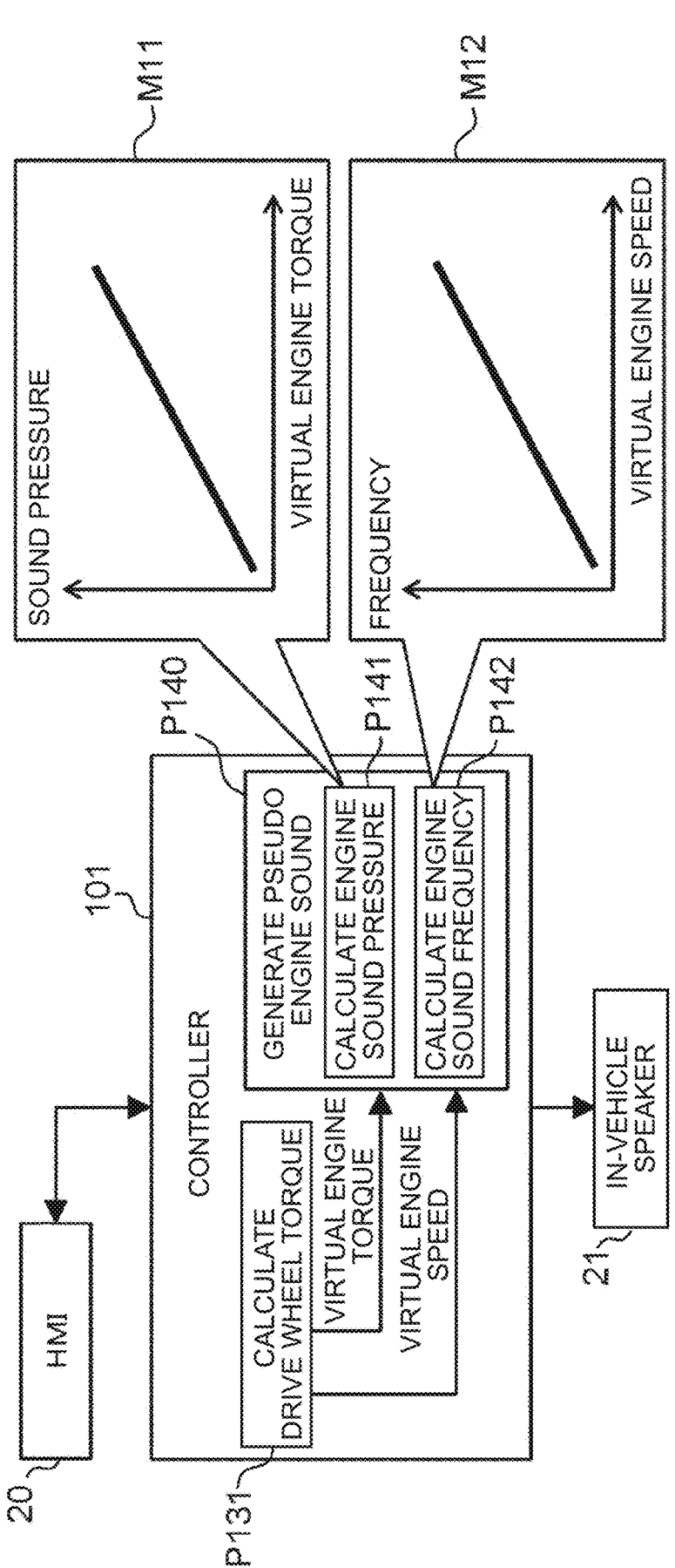
FIG. 5 shows the configuration of the controller related to sound control of the battery electric vehicle.

FIG. 5 shows the configuration of the controller 101 related to the sound control of the battery electric vehicle 100. The processor 102 functions as a sound control device when the processor 102 executes one or more sound control programs 104 stored in the memory 103. The processor 102 functioning as a driving control device and the processor 102 functioning as a sound control device may be different processors, or may be the same processor.

The controller 101 functioning as a sound control device can output artificially generated sounds from the in-vehicle speaker 21. One of such artificial sounds is a pseudo engine sound that imitates an engine sound of a conventional internal combustion engine vehicle. When a control mode signal indicating that the manual mode has been selected is received from the HMI 20, the controller 101 functioning as a sound control device performs a process P140. In the process P140, a pseudo engine sound is generated based on the virtual engine torque and virtual engine speed calculated in the process P131.

In the process P140, an engine sound selected via the HMI 20 is used as a sound source of the pseudo engine sound to be generated from the in-vehicle speaker 21. In the example shown in FIG. 5, an engine sound selected from an inline-four supercharged engine, a flat-six engine, and a V12 engine is used as a sound source of the pseudo engine sound. However, in the process P140, the sound from the sound source is not used as it is. In the process P140, the sound pressure of the sound source is changed by, for example, an amplifier, and the frequency of the sound source is changed by, for example, a frequency modulator.

The process P140 includes a process P141 of calculating an engine sound pressure and a process P142 of calculating an engine sound frequency. In the process P141, the sound pressure of the pseudo engine sound is calculated from the virtual engine torque using a sound pressure map M11. The sound pressure map M11 is created so that the sound pressure increases as the virtual engine torque increases. In the process P142, the frequency of the pseudo engine sound is calculated from the virtual engine speed using a frequency map M12. The frequency map M12 is created so that the frequency increases as the virtual engine speed increases. The virtual engine torque and the virtual engine speed change according to the driver's accelerator operation, shift operation, and clutch operation. Changing the sound pressure and frequency of the pseudo engine sound according to the virtual engine torque and virtual engine speed that change as described above can give the driver a feel as if he or she were actually driving a real manual transmission internal combustion engine vehicle.

As described above, the driver of the battery electric vehicle 100 can experience as if he or she were operating a manual transmission internal combustion engine vehicle while driving the battery electric vehicle 100, by operating the HMI 20 to switch the control mode to the manual mode. More effective uses of such a battery electric vehicle 100 will be considered below.

6. First Application Example

6-1. Automatic Setting of Control Mode According to Driver

In a first application example, the control mode corresponding to the driver is automatically set upon starting of the battery electric vehicle 100. The controller 101 automatically sets the control mode using linking information. FIG. 6 shows an example of linking information 106 the controller 101 uses to automatically set the control mode. The linking information 106 is stored in the memory 103.

The linking information 106 is information that links one or more candidate drivers who may drive the battery electric vehicle 100 with a control mode. In the example of FIG. 6, three candidate drivers, Persons A, B, and C, are registered, and their appearance information is registered as their identification information. For each candidate driver, either the automatic mode or the manual mode is registered as a control mode that the candidate driver selected when he or she last used the battery electric vehicle 100.

The controller 101 updates the linking information 106 every time the driver drives the battery electric vehicle 100. For example, it is herein assumed that Person B registered as a candidate driver enters the battery electric vehicle 100 as a driver, selects the manual mode, and drives the battery electric vehicle 100. After Person B finishes driving, the controller 101 updates the linking information 106 so that Person B is linked with the manual mode as shown in FIG. 6.

Candidate drivers who are registered in the linking information 106 may be automatically updated by the controller 101. For example, when a new person enters the driver's seat of the battery electric vehicle 100, the controller 101 recognizes this person based on an image captured by the in-vehicle camera 27. When this person is not included in the candidate drivers already registered in the linking information 106, this person may be registered in the linking information 106 as a new candidate driver together with his or her appearance information and the control mode that he or she selected. Alternatively, candidate drivers may not be automatically updated, and only those who are registered by an occupant of the battery electric vehicle 100 via the HMI 20 may be registered as candidate drivers.

6-2. Processing Example

Figure 7:
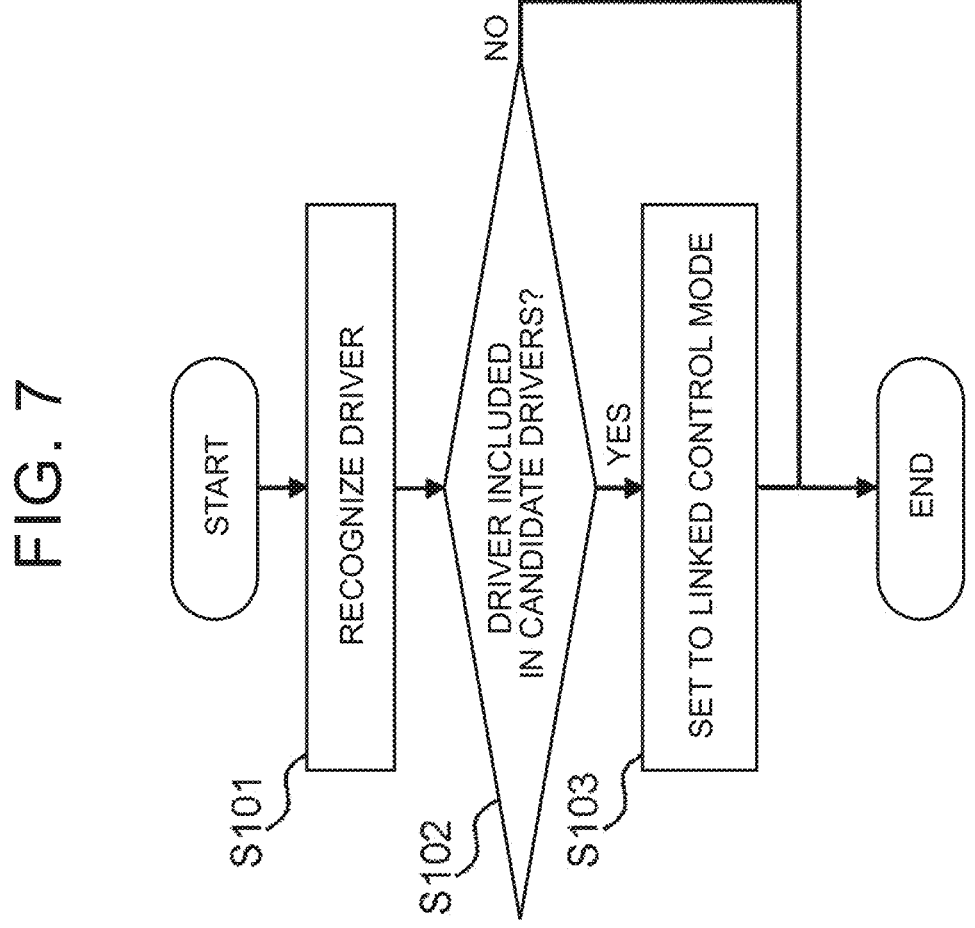
FIG. 7 is a flowchart showing an example of a process related to automatic setting of the control mode.

The controller 101 automatically sets the control mode by referring to the linking information 106. FIG. 7 is a flowchart of a process related to automatic setting of the control mode by the controller 101. The series of steps shown in FIG. 7 is implemented by the processor 102 executing one or more programs 104 stored in the memory 103.

When the battery electric vehicle 100 is started, the controller 101 starts the series of steps. According to the flow shown in FIG. 7, in step S101, the controller 101 first recognizes a new driver who has entered the battery electric vehicle 100. The controller 101 can recognize the driver through biometric authentication such as facial recognition or iris recognition by acquiring a camera image that the in-vehicle camera 27 obtains by capturing an image of the driver, and analyzing the camera image.

Once the driver is recognized, step S102 is performed. In step S102, the controller 101 determines whether the new driver who has entered the battery electric vehicle 100 is included in the candidate drivers registered in the linking information 106. The controller 101 can determine whether the new driver is included in the candidate drivers by checking the recognition result obtained in step S101 against the appearance information registered in the linking information 106.

When the new driver is not included in the candidate drivers, the series of steps ends. When the new driver is included in the candidate drivers, step S103 is performed. In step S103, the controller 101 switches the control mode to the control mode linked with the new driver. For example, when the new driver is determined to be Person A, the automatic mode is started.

At this time, the driver may be notified by a display on the HMI 20 that the control mode has been automatically set. The driver can also switch the control mode at his or her discretion after the control mode is switched by the controller 101.

The linking information 106 shown in FIG. 6 is merely an example. For example, fingerprint information, finger vein information, or voiceprint information may be used as information for biometric authentication. In the case where fingerprint information or finger vein information is used as the linking information 106, the HMI 20 may be provided with an authentication sensor, and a new driver who has entered the battery electric vehicle 100 may be instructed to touch the authentication sensor. In the case where voiceprint information is used as the linking information 106, the voice of the new driver may be acquired by a microphone of the HMI 20.

The candidate driver's identification information that is registered in the linking information 106 may be driver's license information. In this case, for example, the controller 101 can identify the new driver as follows. The controller 101 instructs, via the HMI 20, the new driver who has entered the battery electric vehicle 100 to hold up his or her driver's license. An image of the driver's license presented by the driver is then captured by the in-vehicle camera 27 and analyzed to acquire driver's license information. The acquired driver's license information is then checked against the license information registered in the linking information 106. Which candidate driver the new driver is, or whether the new driver is not included in the candidate drivers, can thus be determined. Alternatively, the identification information may be an identification (ID) number. In this case, for example, the new driver is identified as follows. When the battery electric vehicle 100 is started, a screen for entering an ID number is displayed on the HMI 20. Whether the new driver is included in the candidate drivers can be determined by checking the ID number entered by the new driver against ID numbers registered in the linking information 106.

6-3. Detailed Setting of Control Mode

The manual mode includes various detailed modes. That is, the driver who selects the manual mode can combine the options OP210 to OP250 shown in FIGS. 2 and 3 as desired. The characteristics of a manual transmission internal combustion engine vehicle that are to be simulated by the battery electric vehicle 100 are determined by the combination of the settings regarding the detailed modes included in the manual mode, that is, the combination of the selection results regarding the options OP210 to OP250. When the control mode linked with the candidate driver in the linking information 106 is the manual mode, the linking information 106 may further include information about settings of the detailed modes in such a state that this information is linked with the candidate driver.

FIG. 8 shows an example of such linking information 106. In the example of FIG. 8, the last selection results regarding the options OP210 to OP250, as well as the information that the last selected control mode is the manual mode, are registered as the linking information 106 of Persons B and C. The controller 101 may set the control mode so that the last settings of the detailed modes are also retained.

A process that is performed by the controller 101 when the linking information 106 includes information regarding settings of the detailed modes can also be represented by the same flowchart as that of FIG. 7. When the control mode linked with the candidate driver is the manual mode, however, in step S103, the controller 101 not only switches the control mode to the manual mode, but also switches the detailed modes, that is, the shift mode, engine characteristics, drive mode, and suspension characteristics, to the settings linked with the candidate driver. The last settings need not necessarily be retained for all of the shift mode, engine characteristics, drive mode, and suspension characteristics. The last settings may be retained for any one or more of the shift mode, engine characteristics, drive mode, and suspension characteristics. For example, when Person C newly enters the battery electric vehicle 100, the control mode may be switched to the manual mode and the shift mode may be set to the stick shift mode with clutch operations, and the other modes may be retained as in initial settings. The driver will make a selection regarding these initial settings. Even when any or all of the shift mode, engine characteristics, drive mode, and suspension characteristics are automatically set, the driver can change these settings afterwards as desired.

6-4. Update of Linking Information

As described above, the control mode that had been set when the candidate driver last drove the battery electric vehicle 100 is registered in the linking information. For example, the control mode that had been set when the candidate driver drove the battery electric vehicle 100 may be the control mode that had been set at the following timing. For example, the control mode that was set when the candidate driver drove the battery electric vehicle 100 may be the control mode that had been set when the candidate driver turned off the power of the battery electric vehicle 100 after he or she finished driving the battery electric vehicle 100, in other words, the control mode that had been set between when the candidate driver finished driving and when the candidate driver turned off the power. Alternatively, the control mode that was initially set when the candidate driver last entered the battery electric vehicle 100 and turned on the accessory power of the battery electric vehicle 100 may be registered as the last selected control mode in the linking information 106.

Each driver included in the candidate drivers may be allowed to select whether to register the control mode used in the current trip in the linking information 106. For example, when the driver who usually drives the battery electric vehicle 100 temporarily drives the battery electric vehicle 100 in a different control mode than usual, he or she may be allowed to select not to register the current control mode so that the current settings will not be retained next time. The same applies to the detailed modes included in the manual mode.

6-5. Effects

As described above, since the control mode is automatically set according to the driver, the driver does not have to set the control mode every time he or she enters the battery electric vehicle 100, which improves driver convenience. In particular, since there are many options to select from to determine the detailed modes included in the manual mode, automatically setting the detailed modes can greatly save the driver's effort. The driver thus does not have to enter the same settings every time he or she enters the battery electric vehicle 100, which relieves the driver of the hassle and allows the driver to more comfortably enjoy driving the battery electric vehicle 100. Even after the control mode is automatically set, the driver can also change the settings at his or her discretion. When the driver wishes to drive in a different control mode than the last time, the driver need only enter the settings as usual. Therefore, the advantage of the battery electric vehicle 100 that drivers can select their desired modes will not be compromised.

6-6. Modification: Automatic Setting of Engine Sound

The pseudo engine sound may also be generated when the automatic mode is selected. Automatic setting of the pseudo engine sound will be described below on the assumption that the pseudo engine sound can also be generated in the automatic mode. The driver can select via the HMI 20 whether to have an engine sound or not to have an engine sound. When the driver selects to have an engine sound, he or she can select an engine sound to be replicated. Sound control that is performed when the driver selects to have an engine sound in the automatic mode is the same as the sound control in the manual mode in that the selected engine sound is used as a sound source, and that the sound pressure based on the virtual engine torque and the frequency based on the virtual engine speed are calculated. In the automatic mode, the virtual engine torque is calculated so that, for example, the virtual engine torque increases as the motor torque increases. The virtual engine speed is calculated so that, for example, the virtual engine speed increases as the wheel speed increases. Since the pseudo engine sound is generated and replicated from the in-vehicle speaker 21, this can give the driver a realistic feeling as if he or she were driving a manual transmission internal combustion engine vehicle, regardless of whether he or she operates the pseudo shifting operation members.

One or more candidate drivers and at least engine sounds linked with each of the candidate drivers are registered in the linking information 106. The engine sound linked with each candidate driver is the engine sound selected by that candidate driver the last time. In the case where the candidate driver selected not to have an engine sound the last time, no engine sound is registered.

A process that is performed by the controller 101 regarding automatic setting of the engine sound can be represented by the same flowchart as that of FIG. 7. In this case, however, in step S103, the controller 101 sets an engine sound linked with the new driver who has entered the battery electric vehicle 100. This example can also save the driver's effort to set the engine sound every time he or she enters the battery electric vehicle 100, which is convenient for the driver.

7. Second Application Example: Suggestion of Recommended Settings

In the battery electric vehicle 100, the control mode can be selected between the manual mode and the automatic mode. When the manual mode is selected in the battery electric vehicle 100, it is possible to simulate a manual transmission internal combustion engine vehicle having various characteristics. A large number of characteristics can be set simply by combining the options illustrated in FIGS. 2 and 3, and the battery electric vehicle 100 may be configured to have even more characteristics to select from. Although this increases the fun for the driver, an increased number of options may lead to situations where the driver does not know which characteristics to select. In particular, when the driver is not familiar with the types of manual transmission internal combustion engine vehicles, he or she may have trouble knowing which vehicle characteristics are optimal.

Therefore, in the second application example, the battery electric vehicle 100 has a function to make a suggestion to the driver. FIG. 9 shows an example of the configuration of the controller 101. A recommendation unit 107 of the controller 101 suggests a control mode and vehicle characteristics to the driver. The function of the recommendation unit 107 is implemented by the processor 102 executing one or more programs 104 stored in the memory 103.

The recommendation unit 107 acquires driver information and route information from the HMI 20. For example, the driver enters to the HMI 20 his or her driving experience of a manual transmission internal combustion engine vehicle and the number of times he or she has driven the battery electric vehicle 100, and the information thus entered to the HMI 20 is acquired as the driver information. The route information is information about a travel route that the driver plans to take in the current trip. The travel route may be directly entered to the HMI 20 by the driver, or may be calculated based on the destination entered to the HMI 20 and map information stored in the memory 103.

The recommendation unit 107 selects the optimal control mode and characteristics for the driver based on the driver information or route information, and suggests them to the driver as recommended settings. The suggestion may include a suggestion about selection of the automatic mode or the manual mode, or may include a suggestion about settings of the detailed modes in the manual mode.

The suggestion may be made at the timing when the driver starts driving. For example, the recommendation unit 107 acquires the driver information from the HMI 20 when the driver starts driving. Settings of the manual mode that allow relatively easy driving may be suggested to a driver who is not used to operating a manual transmission internal combustion engine vehicle. For example, a shift mode that does not require clutch operations, such as the paddle shift mode or the stick shift mode with no clutch operation, may be suggested, or an option that provides flat engine characteristics may be suggested. On the other hand, advanced settings may be suggested to a driver who is used to operating a manual transmission internal combustion engine vehicle. For example, the stick shift mode with clutch operations or engine characteristics with peaky features may be suggested.

Information entered by the driver via the HMI 20 may be acquired as the driver information, or information stored in the memory 103 or an external server may be used as the driver information. For example, the driving history of each driver may be stored in a server. When the driver starts driving, the recommendation unit 107 acquires an image captured by the in-vehicle camera 27, recognizes the driver, and reads the driver's driving history from the server. The recommendation unit 107 suggests to the driver the control mode and vehicle characteristics that match the driver's driving history. The driving history includes the driving distances and driving times in each control mode and vehicle characteristics. The driving history may include, for example, the driving distance in the stick shift mode with no clutch operation and the driving distance in the stick shift mode with clutch operations. In this case, the recommendation unit 107 may suggest to the driver the shift mode according to the comparison result between these driving distances. The driver's driving skills may be determined from the driving history, and the content of the suggestion that is given before the driving skills reach a certain level may be made different from the content of the suggestion that is given after the driving skills have reached the certain level. For example, settings for beginner to intermediate drivers may be suggested before the driving skills reach the certain level, and settings for advanced drivers may be allowed to be suggested once the driving skills reaches the certain level.

The control mode may be suggested during driving, and the driver information may be acquired based on an image from the in-vehicle camera 27. For example, while the driver is driving the battery electric vehicle 100 in the manual mode, the recommendation unit 107 acquires an image of the driver from the in-vehicle camera 27 and determines his or her fatigue level from his or her eye movements, eyelid movements, etc. Since a known technique can be used to determine the driver's fatigue level, detailed description thereof will be omitted. When it is determined based on information indicating the driver's fatigue level that the fatigue level is high, a suggestion is made to switch the control mode to the automatic mode.

Examples of suggestions based on the route information include the following. When the driver starts driving, the recommendation unit 107 acquires the route information, and recommends vehicle characteristics suitable for the planned travel route. For example, when the planned travel route includes many uphills, the four-wheel drive mode may be suggested as the drive mode in order to allow powerful driving. Alternatively, when the planned travel route includes many corners, the rear-wheel drive mode may be suggested as the drive mode.

According to the battery electric vehicle 100 in the second application example, the control mode and vehicle characteristics that suit the planned travel route and the driver's condition and skills are suggested to the driver. Therefore, even a driver who does not know much about the differences among the characteristics of a manual transmission internal combustion engine vehicle will not have trouble deciding which control mode or characteristics to select. Even for an experienced driver, accepting the suggestion increases the possibility that he or she can select the mode that is more suited to the situation. The driver's sense of security and ease of driving can thus be enhanced.

The recommendation unit 107 may further acquire weather information and road traffic information including traffic congestion information, and may suggest the control mode and vehicle characteristics based on these pieces of information. For example, when a traffic congestion is expected on the planned travel route, the paddle shift mode or the stick shift mode with no clutch operation may be suggested. When there is an accident on the planned travel route, the automatic mode may be suggested so that the driver can drive with peace of mind. When a snowfall is expected, the four-wheel drive mode may be suggested as the drive mode, and the low to medium rotation type may be suggested as the engine characteristics.

8. Other Embodiments

As another configuration of the battery electric vehicle 100, the battery electric vehicle 100 may not include the pseudo paddle shifter 25, and may include only the pseudo H-shifter 24 and the pseudo clutch pedal 26. As still another configuration of the battery electric vehicle 100, the battery electric vehicle 100 may not include the pseudo H-shifter 24 and the pseudo clutch pedal 26, and may include only the pseudo paddle shifter 25. As yet another configuration of the battery electric vehicle 100, the battery electric vehicle 100 may not include the pseudo paddle shifter 25 and the pseudo clutch pedal 26, and may include only the pseudo H-shifter 24.

Although the battery electric vehicle 100 includes the electric motors 4F, 4R at the front and rear, the battery electric vehicle of the present disclosure may include only one of them. Although the battery electric vehicle 100 is a battery electric vehicle (BEV) that runs on the electricity stored in the battery 2, the battery electric vehicle of the present disclosure may be any battery electric vehicle that includes an electric motor as a driving source. Therefore, the battery electric vehicle of the present disclosure is also applicable to plug-in hybrid electric vehicle (PHEVs) and fuel cell electric vehicles (FCEVs).

What is claimed is:

1. A battery electric vehicle including an electric motor as a driving source and having a plurality of control modes that is selectable by a driver, the battery electric vehicle comprising:

a driving operation member that is used to drive the battery electric vehicle; a pseudo shifting operation member imitating an operation member that is used to perform a shifting operation of a manual transmission internal combustion engine vehicle; and a controller configured to control the battery electric vehicle according to an operation of the driving operation member, wherein the control modes include a manual mode in which an operation of the pseudo shifting operation member is associated with torque of the electric motor, and an automatic mode in which the operation of the pseudo shifting operation member is not associated with the torque of the electric motor, the controller includes a memory configured to store linking information in which one or more candidate drivers are linked with the control mode and registered, the controller is configured to determine, upon starting of the battery electric vehicle, whether a new driver who has entered the battery electric vehicle is included in the one or more candidate drivers, the controller is configured to, when the new driver is included in the one or more candidate drivers, start the control mode linked with the new driver, the control mode linked with the new driver is the control mode that was selected when the new driver last drove the battery electric vehicle, and the control mode that was selected when the new driver last drove the battery electric vehicle is the control mode that had been set between when the new driver last finished driving the battery electric vehicle and when the new driver turned off power of the battery electric vehicle, or the control mode that was set when the new driver last entered the battery electric vehicle and turned on accessory power of the battery electric vehicle.

2. The battery electric vehicle according to claim 1, wherein:

when in the manual mode, a characteristic of the manual transmission internal combustion engine vehicle that is to be simulated by the battery electric vehicle is determined according to a setting related to a detailed mode that is selectable by the driver;

the linking information includes information about the setting related to the detailed mode linked with the one or more candidate drivers; and the controller is configured to, when the new driver has been linked with the manual mode upon starting of the battery electric vehicle, set the detailed mode to the setting linked with the new driver.

3. The battery electric vehicle according to claim 2, wherein the setting related to the detailed mode is either a selection result from options or a combination of selection results from the options, the options being options related to any one or more of the following: an engine characteristic, an engine sound, a drive mode, and a suspension characteristic.

4. The battery electric vehicle according to claim 2, wherein the setting related to the detailed mode is either a selection result from options or a combination of selection results from the options, the options being options related to any one or more of the following: a shift mode, an engine characteristic, an engine sound, a drive mode, and a suspension characteristic.

5. The battery electric vehicle according to claim 1, wherein:

the driving operation member includes an accelerator pedal; and the pseudo shifting operation member includes a pseudo H-shifter imitating an H-shifter of a manual transmission, and a pseudo clutch operation device imitating a clutch operation device.

6. The battery electric vehicle according to claim 5, wherein the controller is configured to, when in the control mode, change the torque of the electric motor according to a shift position selected by the pseudo H-shifter, an amount of operation of the pseudo clutch operation device, and an amount of operation of the accelerator pedal.

7. The battery electric vehicle according to claim 1, wherein:

the driving operation member includes an accelerator pedal; and the pseudo shifting operation member includes a pseudo sequential shifter imitating a sequential shifter of a manual transmission.

8. The battery electric vehicle according to claim 7, wherein the controller is configured to, when in the control mode, change the torque of the electric motor according to a shift position selected by the pseudo sequential shifter and an amount of operation of the accelerator pedal.

9. The battery electric vehicle according to claim 1, wherein:

the driving operation member includes an accelerator pedal; and the pseudo shifting operation member includes a pseudo H-shifter imitating an H-shifter of a manual transmission.

10. The battery electric vehicle according to claim 9, wherein the controller is configured to, when in the control mode, change the torque of the electric motor according to a shift position selected by the pseudo H-shifter and an amount of operation of the accelerator pedal.

11. The battery electric vehicle according to claim 6, wherein:

the driving operation member includes an accelerator pedal;

the pseudo shifting operation member includes a pseudo H-shifter imitating an H-shifter of a manual transmission, a pseudo clutch operation device imitating a clutch operation device, and a pseudo sequential shifter imitating a sequential shifter of the manual transmission; and the detailed mode includes a mode in which the torque of the electric motor is changed according to a shift position selected by the pseudo H-shifter, an amount of operation of the pseudo clutch operation device, and an amount of operation of the accelerator pedal, a mode in which the torque of the electric motor is changed according to a shift position selected by the pseudo sequential shifter and the amount of operation of the accelerator pedal, and a mode in which the torque of the electric motor is changed according to the shift position selected by the pseudo H-shifter and the amount of operation of the accelerator pedal.

\* \* \* \* \*